Patented Oct. 7, 1952

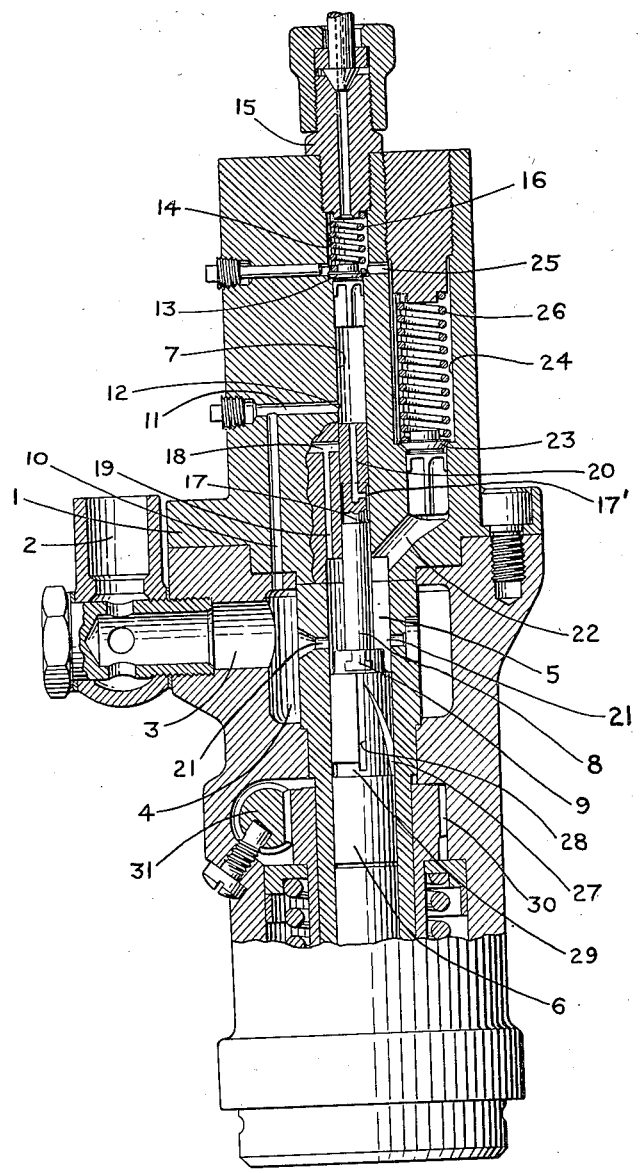

2,612,842

UNITED STATES PATENT OFFICE 2,612,842

FUEL INJECTION PUMP

George Steven, Kenmore, and Roy R. Fruehauf, Buffalo, N. Y., assignors to Worthington Corporation, a corporation of Delaware Application November 13, 1946, Serial No. 709,514

26 Claims. (Cl. 103—41)

This invention relates to fuel injection pumps for delivering fuel under pressure to the cylinders of internal combustion engines of the compression ignition type and more particularly to a dual plunger fuel injection pump for use in connection with liquid fuel injection engines, internal combustion engines of the dual fuel type and engines operated on a gaseous fuel which is ignited by pilot fuel oil injected into the cylinder.

Though it will be obvious that it is not so limited, the present invention is particularly useful for the dual fuel internal combustion engine of the compression ignition type. In this type of engine both gaseous fuels, such as sewer or natural gas, and the usual liquid fuels may be burned. As shown in Patent No. 2,400,219, issued to James C. Barnaby et al., and Patent No. 2,400,247, issued to R. Miller et al., it is the usual practice to operate these engines on the fuel gas as long as sufficient power is developed but, when required, automatic means inject supplemental liquid fuel oil into the engine.

It has been found that the characteristics of the gaseous fuels in this type of engine are such that a pilot charge of injection oil is required for ignition. Since this charge is quite different than that required when the engine is operating principally on fuel oil, it has been found preferable to provide a separate pilot injection system for use when the engine is operating on gaseous fuel. It is clearly desirable to eliminate this separate system without sacrificing operation, and an object of the present invention is to do so by combining the pilot system with the system used for regular injection of oil fuel.

When the dual fuel engine is switched to operation on oil fuel, by suitable means such as disclosed in the abovementioned patents, it becomes essentially a diesel type engine. Similar problems are encountered therefore and one of these is noisy combustion or "knocking." It may be said in general terms that this is believed to be caused by an excessive quantity of fuel having been injected into the engine cylinder before ignition begins.

It has long been believed that this "knocking" could be controlled by providing pilot injections of small quantities of fuel oil. When these ignite they do not cause "knocks" but still generate sufficient heat to ignite the main charge of fuel which follows. Thus, with regard to the main charge, there is reduced "ignition lag." Total fuel injection in accordance with this method therefore consists of two stages, first the pilot charge and, then, the main charge.

Control of the quantity of fuel injected in each stage is clearly desirable. This can, of course, be accomplished by two separate systems, one for pilot injection and the other for main injection. Such an arrangement, however, has the disadvantages of being unnecessarily expensive and complex to manufacture and operate. Fuel pumps have, therefore, been developed which provide both pilot and main injection, through one injection nozzle.

It is an object of the present invention to provide a fuel pump which, in general, is not subject to the disadvantages of the prior art devices and which, in particular, has two rates of injection, a pilot rate and a main rate, which are not basically controlled by cams or by-passes.

When the fuel pump is used on a dual fuel engine which is operating on gaseous fuel, the main charge is not required and it is, therefore, an object of the invention to provide a fuel pump having two injection stages, one of which may be rendered inoperative.

In contrast to the prior art, the present invention contemplates control of the rate of injection by means of the piston area. In order to provide two injection stages, the present invention has two pistons of different areas. The piston of smaller area is used for the pilot injection. A feature of the invention makes it possible to use both pistons for the main charge. It will, thus, be realized that the invention provides a relatively slow rate of pilot injection and a high rate of main injection.

With these and other objects in view, as may appear from the accompanying specification, the invention consists of various features of construction and combination of parts, which will be first described in connection with the accompanying drawing which shows the preferred form of the fuel injection pump partly in longitudinal section and partly in elevation, and the features forming the invention will be specifically pointed out in the claims.

Referring more particularly to the drawings the improved fuel injection pump comprises a body or casing 1 having an inlet 2 for fuel oil opening through the passage 3 into the annular chamber 4.

The body 1 is provided with the main or large cylinder bore 5 in which the plunger 6 is reciprocated by any suitable and well known cam and spring means (not shown) and also with the cylinder bore 7 which is of smaller diameter than the cylinder bore 5 and in which the pump plunger 8 reciprocates.

The plunger 8 is connected to the plunger 6 for reciprocation therewith in any suitable manner so that only axial forces are transmitted between the plungers, such as by the T head and slot connection shown at 9. The T head and slot connection 9 is provided with sufficient clearance to permit the plunger 8 to align itself in the cylinder bore 7.

The fuel oil passes from the annular chamber 4 through the passages 10 and 11 into the cylinder bore 7 outwardly or upwardly of the outer end of the plunger 8, and on the upstroke of the pump the plunger 8 first covers the port 12 and the fuel oil thus trapped in the cylinder bore 7 is discharged through the check valve 13 through the spring retaining chamber 14 and out through the bore of the spray valve tubing connector 15 to the spray valve (not shown) of the engine (not shown).

The check valve 13 is held seated on its seat by the action of a spring 16 until the tension of the spring is overcome by the pressure of the fuel oil being pumped by the plunger 8.

To effect a change in the rate of fuel injection for a given plunger velocity the diameter of the plunger 8 may be varied to suit design requirements.

When the plunger 8 has moved outward sufficiently to discharge the desired or required quantity of pilot fuel through the connector 15 the portion 17 of the plunger 8, which portion is reduced in diameter over the rest of the plunger moves into registration with the port 18 which opens through the passage 19 into the cylinder bore 5 and the fuel oil remaining in the cylinder bore 7 at such time passes through the passage 20 in the plunger 8 and out through the passage 19 into the cylinder bore 5 where it is either discharged with the fuel oil discharged by the plunger 6 or by-passed as will be hereinafter described. Duration of the period of fuel injection by the plunger 8 can be increased or decreased by changing the relative spacing of the ports 12 and 18 or by changing the length of the land or portion of the plunger 8 outwardly of the reduced portion 17 thereof.

At a predetermined time differential the main or larger plunger 6 covers the ports 21 which establish communication between the storage chamber 4 and the cylinder bore 5 and the plunger proceeding on its outward movement forces the fuel oil out of the cylinder bore 5 through the passage 22, past the check valve 23 into the chamber 24. From the chamber 24 the fuel oil passes through passage 25 into the chamber 14 outwardly of the check valve 13 and thence through the spray valve tubing connector 15 to the spray valve (not shown) of the engine (not shown).

The time differential between the discharge of fuel by the plunger 8 and by the plunger 6 may be regulated as required for the application of the fuel injection pump by changing the relative spacing of the ports 12 and 21 or by changing the length of the plunger 6.

The check valve 23 is held against its seat by a spring 26 located in the chamber 24 until such times as the tension of the spring is overcome by the pressure of fuel oil discharged by the plunger 8.

The plunger 6 continues on its forward movement to discharge fuel oil through the passage 22 until such time as the helical by pass 27 formed in the plunger 6 communicates with and uncovers the port 21 and the fuel oil is bypassed through the groove 28 cut in the plunger and the space formed by the reduced portion 29 of the plunger 6, to the storage chamber 4.

Rotation of the plunger or piston 6 changes the relative position of the helical groove or channel 27 and the hole or opening 21 and varies the point in the stroke of the plunger or piston 6 at which the hole or suction opening 21 is uncovered and thus varies the amount of oil discharged. If the plunger 6 is rotated until the groove or channel 28 is in line with the hole or suction opening 21, no oil will be discharged from the cylinder 5 as it will always be connected to the suction chamber 4 through the helical groove or channel 27 and the groove or channel 28.

The bore 7 receives oil from the suction chamber 4 through the passage 10. The opening 12 of the passage 10 is positioned so that it is uncovered when the piston or plunger 17 is in the lower portions of its stroke. The housing may have another passage 19 which opens at one end into the cylinder 8 and at its upper end 18 into the bore 7 below the opening 12. The piston 17 has an annular groove 17' formed therein which is adapted to communicate with the opening 18, the groove 17' being connected to the top of the piston and, thus to the open portions of the bore 12, by means of a suitable passage 20 in the piston which opens out of the top thereof.

When the fuel pump is used on a dual fuel engine operating solely on gaseous fuel, the rack 31 and gear 30 mechanism is actuated, manually or by suitable automatic means such as shown in the abovementioned patents to Barnaby et al. and Miller et al., to rotate the plunger 6 so that the groove or channel 28 is in alignment with the inlet hole or passage 21. When this is done, the top of the plunger or piston 6 is always connected to the suction chamber 4 so that the plunger 6 will not pump oil since the pressure in the cylinder 5 cannot rise substantially above that in the suction line 3.

The plunger 6 and the piston or plunger 17 are reciprocated by any suitable means (not shown). On the down stroke oil is drawn into the cylinder 5 through the hole 21 and into the bore 7 through the passages 10, 11 and port 12. On the up stroke, the oil in the cylinder 5 is by-passed to the suction chamber 4, as above mentioned. On the upstroke the oil in the cylinder 7 is discharged through the port 12 to the suction chamber until the plunger covers the port 12. The pressure of the oil in the cylinder 7 is then increased by upward movement of the plunger 8 until it is sufficient to open the check valve 13. Further upward movement causes oil to be discharged through the bore of the connector 15 into the engine (not shown). When the piston or plunger 8 rises to the point where the annular groove 17' communicates with the hole or opening 12, the bore 7 is connected to the suction chamber 4 through the passages 20, 18 and 19. The check valve 13, therefore, closes and pilot injection ceases.

When it is desired to operate on two stages, i. e., pilot charge and then a main charge, the piston or plunger 6 is rotated so that groove 28 is not in alignment with the opening 15. The opening 12 and the holes 21 may be positioned so that in the down plunger position the opening is closer to the top of the piston 8 than the holes or openings 21 are to the top of the plunger 8. When the plunger or piston 6 rises to the point where it covers the holes 21, it will force oil out of the cylinder 5 through the passage 22 and past the check valve 23 into the bore 24. Oil flows from the bore 24 through the passage 25 into the upper part of the bore 7 above the check valve 13 and is forced to the engine (not shown) through the connector 15. It will be recognized that the oil flowing through the connector 15 at this point in the second stage consists of oil from the bore or cylinder 7 and oil from the cylinder 5. When the piston or plunger 8 rises to the position in which the groove 17' and the passages 18 and 19 connect the bore or cylinder 7 to the cylinder 5, then oil from the cylinder 5 will still be forced into the connector 15 by both the piston or plunger 6 and the plunger 8 as it can no longer by-pass to the cylinder 5 since the pressure therein is substantially the same as the pressure in the cylinder 7. Discharge of oil continues until the helical groove 27 on the plunger 6 comes into alignment with the opening 21. This connects the cylinder 5 through the groove or channel 28, helical groove 27 and hole or opening 15 with the suction chamber 4 so that the pressure drops and the check valves 13 and 23 close to prevent any material return of oil through the connector 15.

On the return stroke of the plunger 6 the plunger 8 follows because of its connection with the plunger 6 through the T head and slot connection 9. While a T head and slot connection are shown in the drawings any other suitable means may be provided to cause the smaller plunger 8 to move with larger plunger 6, such as a spring (not shown) which engages the plunger 8 and holds it in engagement with the forward end of the plunger 6.

The quantity of fuel oil discharged by the plunger 6 may be regulated by adjusting the angular position of the plunger 6 relative to the cylinder 5 and consequently regulating the relation of the helical channel or groove 27 relative to the port 21. This regulation is provided by the well known type of mechanism including the gear 30 and rack 31. From the construction shown it will be apparent that when the fuel injection pump is operating to supply a minimum quantity of pilot oil to a dual fuel engine such as those disclosed in United States Patents Nos. 2,400,219, May 14, 1946, and 2,400,247, May 14, 1946, pilot fuel or oil can be discharged by the small plunger 8 only.

While in the foregoing specification it is stated that the pilot charge of fuel precedes the main injection of fuel oil, it is to be understood that the invention is not specifically limited to such sequence of fuel injection, but that the pilot charge may start in any suitable or desirable timing relation with the main fuel injection charge.

It will be understood that the invention is not to be limited to the specific construction or arrangement of parts shown, but that they may be widely modified within the invention defined by the claims.

What is claimed is:

1. In a fuel injection pump, a relatively small plunger and cylinder for providing a relatively slow rate of injection, a larger plunger and cylinder for providing a higher rate of injection than provided by the small plunger and cylinder, and by-pass means controlled by said small plunger for by-passing fuel from said small cylinder to said larger cylinder.

2. In a fuel injection pump, a relatively small plunger and cylinder for providing a relatively slow rate of injection, a larger plunger and cylinder for providing a higher rate of injection than provided by the small plunger and cylinder, by-pass means controlled by said small plunger for by-passing fuel from said small cylinder to said larger cylinder, and a check valve for preventing return of fuel when said by-pass means is by-passing fuel to said larger cylinder.

3. In a fuel injection pump, a relatively small plunger and cylinder for providing a relatively slow rate of injection, a large plunger and cylinder for providing a higher rate of injection than provided by the small plunger and cylinder, by-pass means controlled by said small plunger for by-passing fuel from said small cylinder to said larger cylinder, a check valve for preventing discharge of fuel by said small plunger when said by-pass means is by-passing fuel to said larger cylinder, and means connecting said plungers for unitary axial movement and independent rotary movement.

4. In a fuel injection pump, a body having a large cylinder bore and a small cylinder bore in approximate alignment therewith, each bore provided with a discharge passage, said pump body having a discharge passage therein to which said cylinder bore discharge passages connect, a large plunger in said large cylinder bore, a small plunger in said small cylinder bore, said body provided with passages for delivering fuel to said small cylinder bore, and other passages for delivering fuel to the large cylinder bore, said passages arranged whereby upon reciprocation of the plunger said small plunger will discharge a predetermined quantity of fuel through said discharge passage prior to discharge of fuel by said large plunger, said pump body provided with a by-pass leading from said small cylinder bore to said large cylinder bore, and said small plunger controlling said by-pass and constructed to permit by-passing of fuel from the small cylinder bore to the large cylinder bore after a predetermined quantity of fuel has been discharged by said small plunger.

5. In a fuel injection pump, a body having a large cylinder bore and a small cylinder bore in approximate alignment therewith, each bore provided with a discharge passage, said pump body having a common discharge passage therein to which said cylinder bore discharge passages connect, a large plunger in said large cylinder bore, a small plunger in said small cylinder bore, said body provided with passage for delivering fuel to said small cylinder bore, and other passages for delivering fuel to the large cylinder bore, said passages arranged whereby upon reciprocation of the plunger said small plunger will discharge a predetermined quantity of fuel through said discharge passage prior to discharge of fuel by said large plunger, said pump body provided with a by-pass leading from said small cylinder bore to said large cylinder bore, said small plunger controlling said by-pass and constructed to permit by-passing of fuel from the small cylinder bore to the large cylinder bore after a predetermined quantity of fuel has been discharged by said small plunger, and a tensioned check valve for preventing return of fuel through said discharge passage during by-passing of fuel from said small cylinder bore to said large cylinder bore.

6. In a fuel injection pump, a body having a large cylinder bore and a small cylinder bore in approximate alignment therewith, each bore provided with a discharge passage, said pump body having a common discharge passage therein to which said cylinder bore discharge passages connect, a large plunger in said large cylinder bore, a small plunger in said small cylinder bore, said body provided with passages for delivering fuel to said small cylinder bore, and other passages for delivering fuel to the large cylinder bore, said passages arranged whereby upon reciprocation of the plunger said small plunger will discharge a predetermined quantity of fuel through said discharge passage prior to discharge of fuel by said large plunger, said pump body provided with a by-pass leading from said small cylinder bore to said large cylinder bore, said small plunger controlling said by-pass and constructed to permit by-passing of fuel from the small cylinder bore to the large cylinder bore after a predetermined quantity of fuel has been discharged by said small plunger, and by-pass means in said body and large plunger for by-passing fuel after a predetermined quantity of fuel has been discharged by said large plunger.

7. In a fuel injection pump, a housing having first and second cylinders of different diameters, plungers reciprocatably mounted in said cylinders, said housing having suction passages for oil therein which open through suction openings into each of said cylinders, said suction openings being located different distances from the effective tops of the plungers in the extreme suction position, said housing having a discharge passage therein for the passage of oil from the cylinders, and means for imparting the same velocities of reciprocation to the plungers so that one plunger covers its suction opening before the other plunger covers its suction opening and thus discharges first.

8. In a fuel injection pump, a housing having first and second cylinders of different diameters therein, plungers reciprocatably mounted in said cylinders, said housing provided with suction passages which open through suction openings into each of said cylinders at different positions with respect to the effective tops of the plungers in their extreme suction positions, said housing having a discharge passage therein common to both cylinders for the passage of oil from the cylinders, means for moving the plungers at substantially the same speed rates, a passageway connecting said cylinders, said passageway opening into the first cylinder at a point which is above the effective top of its plunger and into the other cylinder at a point which is between the suction opening and the top of its plunger in its extreme suction position, and passages in the last mentioned plunger adapted to register with the passageway connecting the cylinders to provide communication between the upper portions of the cylinders whereby the total effective area of the plungers is utilized to pump oil.

9. In a fuel injection pump, a housing having therein a first small cylinder and a second cylinder of larger diameter than the first cylinder, a pilot plunger reciprocatably mounted in the first cylinder, a main plunger reciprocatably mounted in the second cylinder, said housing provided with passages for oil opening through suction openings into each of said cylinders, the suction opening in the small cylinder being closer to the effective top of the pilot plunger than the suction opening in the large diameter cylinder is to the effective top of the main plunger, means for moving said plungers at such a rate that the pilot plunger blocks its suction opening before the main plunger blocks its suction opening and thus the pilot plunger discharges oil prior to discharge of oil by the main plunger, said housing having a discharge passage therein common to both cylinders for the discharge passage of oil from the cylinders.

10. In a fuel injection pump, a housing having therein a first cylinder and a second cylinder, a pilot plunger in the first cylinder, a main plunger in the second cylinder, said housing having suction passages therein opening their suction openings into each of said cylinders, said suction openings being arranged so that the suction opening of the first cylinder is blocked by the pilot plunger before the suction opening to the second cylinder is blocked by the main plunger, said housing having a chamber therein and also having a fluid passage therein connecting said chamber to the upper portion of the second cylinder, a check valve in said fluid passage to prevent back-flow of fluid into the cylinder, said housing having a second chamber therein connected to a discharge passage in the housing, said housing also having a passage therein connecting the first mentioned chamber to said second chamber, said first cylinder communicating directly with said second chamber, and a check valve in said second chamber for preventing back flow of fluid into the first cylinder.

11. In a fuel injection pump as claimed in claim 10, a fluid passageway connecting the upper portion of the second cylinder to the first cylinder and opening into the first cylinder between the suction opening and the second cylinder, and a passageway connecting the top of the pilot plunger to an intermediate portion of the pilot plunger and adapted to register with said fluid passageway.

12. A fuel injection pump as claimed in claim 10 wherein said first cylinder and second cylinder are arranged in end-to-end axial alignment and which includes means connecting said pilot plunger and said main plunger to provide transmission of axial forces between the plungers.

13. In a fuel injection pump, a housing having therein first and second co-axial bores, said second bore being of larger diameter than said first bore, a pilot plunger in the first bore, a main plunger in the second bore, said housing having suction passages therein opening through suction openings into each of said bores, said housing provided with a passageway opening into the top of said second bore and into said first bore below the suction opening into the first bore, said pilot plunger provided with an annular groove therein between its ends and with a passageway communicating with said annular groove and opening out through the top of the pilot plunger.

14. In a fuel pump, a pump casing assembly providing adjacent cylinders and a fuel discharge passage leading from each cylinder to a common discharge passage for the pump, fuel inlet means connected to one of said cylinders, said cylinders being in fuel flow communication, a variable fuel displacement plunger operably mounted in one of said cylinders, a constant fuel displacement plunger operably mounted in another of said cylinders and connected to said first mentioned plunger for operation therewith, and means for regulating the fuel displacement operation of said variable displacement plunger to effect control of the total fuel delivery from the sump.

15. In a fuel pump, a pump casing assembly providing adjacent cylinders and a fuel discharge passage leading from each cylinder to a common pump discharge passage, said cylinders being in fuel flow communication, fuel inlet means connected with one of said cylinders, fuel displacement plungers mounted one in each of said cylinders and operatively connected for concurrent fuel displacement action, one of said plungers being adapted to effect fuel displacement variations and the other thereof being adapted to effect a predetermined constant fuel displacement, and means for regulating the fuel displacement action of said one plunger to control the fuel delivery from the pump.

16. In a fuel pump, a casing providing a pair of cylinders in fuel flow communication and a fuel discharge passage leading from each cylinder to a common pump discharge passage, fuel inlet means for one of said cylinders; a pair of interconnected plungers operably mounted one in each cylinder, one of said plungers being adapted to provide a substantially constant and small predetermined fuel displacement and the other being adapted to provide for fuel displacement variations through a range less than and in excess of said one plunger, and control means for regulating said variable fuel displacement plunger to control the fuel delivery from the pump.

17. In a fuel pump, a casing providing a pair of substantially axially aligned cylinders in fuel flow communication, fuel inlet means for one cylinder; said casing having a discharge passage connected with each of said cylinders, a substantially constant fuel displacement plunger working in one of said cylinders, a variable fuel displacement plunger working in the other of said cylinders, means for regulating the effective fuel displacing action of said last mentioned plunger, and means adapted to operatively associate said plungers one in axial alignment with the other.

18. In a fuel pump, a casing assembly providing axially aligned cylinders in fuel flow communication and discharge passages leading from each cylinder to a common discharge chamber, a fuel displacing plunger operatively disposed in each cylinder, one of said plungers being adapted for effecting a variable fuel displacement and the other thereof being adapted to effect a predetermined minimum fuel displacement, means interconnecting said plungers for concurrent actuation, a valve disposed one in each of said cylinder discharge passages to prevent reverse flow of fuel from said discharge chamber into said cylinders, and control means adapted to effect fuel displacement regulation of said one plunger.

19. In a fuel pump, a pump cylinder having a plunger bore and a fuel inlet port therein, a second pump cylinder arranged in axial prolongation of the first said cylinder and having a plunger bore in fuel flow communication with the bore of the latter cylinder, a variable fuel displacement plunger operably disposed in the bore of said first cylinder, said second cylinder providing a fuel flow passage around the plunger bore therein for communication with said first cylinder whereby said plunger is enabled to displace fuel therethrough, a constant fuel displacement plunger operably disposed in said second cylinder for displacing fuel flowing thereto from the first said cylinder and means interconnecting said plungers for concurrent operation, said interconnecting means enabling regulation of said variable fuel displacement plunger independently of the fuel displacing operation of said constant displacement plunger.

20. In a fuel pump, a casing assembly comprising a body having a cylinder and a cylinder fuel inlet port, a body member having a pair of valve chambers and a fuel discharge chamber communicating with each of the valve chambers, and means interconnecting said body and body member and having a cylinder open at all times to said body cylinder and in flow communication with one valve chamber, said last means further having a passage in flow communication between said body cylinder and the other valve chamber, valve elements operably mounted one in each of said valve chambers to prevent the reverse flow of fuel from said discharge chamber to said cylinders, fuel displacement plungers operably disposed one in each of said cylinders and interconnected for unisonous operation, the plunger in said body cylinder serving to displace fuel from said inlet port to and through one of said valves, and the other plunger serving to displace fuel to and through the other of said valves, and control means connected with the plunger in said body cylinder for regulating its fuel displacement action.

21. In a fuel injection pump for internal combustion engines, a pair of cylinders, a plunger in each of said cylinders, each of said cylinders and its respective plunger being relatively movable and each of said plungers being capable of normally producing a different quantity of injection than the other of said plungers, valve means for controlling the delivery of each of said plungers and its respective cylinder, a fuel delivery line communicating with said valve means and adapted to deliver fuel from both of said cylinders to a combustion chamber, one of said plungers and its respective cylinder being capable of effecting a portion of its injection at a time different than the time of the injection effected by the other of said plungers and its respective cylinder.

22. In a fuel injection pump for internal combustion engines, a pair of cylinders, a plunger in each of said cylinders, each of said cylinders and its respective plunger being relatively movable and each of said plungers being capable of normally producing a different quantity of injection than the other of said plungers, separate valve means for controlling the delivery of each of said plungers and its respective cylinder, a fuel delivery line communicating with each of said valve means and adapted to deliver fuel from both of said cylinders to a combustion chamber, one of said plungers and its respective cylinder being capable of effecting a portion of its injection at a time different than the time of the injection effected by the other of said plungers and its respective cylinder.

23. In a fuel injection pump for internal combustion engines, a pair of cylinders, a plunger in each of said cylinders, each of said cylinders and its respective plunger being relatively movable and each of said plungers being capable of normally producing a different quantity of injection than the other of said plungers, valve means for controlling the delivery of each of said plungers and its respective cylinder, a fuel delivery line communicating with said valve means and adapted to deliver fuel from both of said cylinders to a combustion chamber, one of said plungers and its respective cylinder being capable of effecting a portion of its injection at a time different than the time of the injection effected by the other of said plungers and its respective cylinder, the extent and time of relative motion of both of said plungers in their respective cylinders being identical.

24. In a fuel injection pump for internal combustion engines, a housing, a pair of cylinders in said housing, a plunger in each of said cylinders, each of said cylinders and its respective plunger being relatively movable and each of said plungers being capable of normally producing a different quantity of injection than the other of said plungers, separate valve means communicating with each of said cylinders for controlling the delivery of each of said plungers and its respective cylinder, a fuel delivery line communicating with each of said valve means and adapted to deliver fuel from both of said cylinders to a combustion chamber, one of said plungers and its respective cylinder being capable of effecting a portion of its injection at a time different than the time of the injection effected by the other of said plungers and its respective cylinder.

25. In a fuel injection pump for internal combustion engines, a housing, a pair of cylinders in said housing, a plunger in each of said cylinders, each of said cylinders and its respective plunger being relatively movable and each of said plungers being capable of normally producing a different quantity of injection than the other of said plungers, separate valve means communicating with each of said cylinders for controlling the delivery of each of said plungers and its respective cylinder, a fuel delivery line communicating with each of said valve means and adapted to deliver fuel from both of said cylinders to a combustion chamber, one of said plungers and its respective cylinder being capable of effecting a portion of its injection at a time different than the time of the injection effected by the other of said plungers and its respective cylinder, the extent and time of motion of both of said plungers and their respective cylinders being identical.

26. In a fuel injection pump, a pump body having a large cylinder bore and a small cylinder bore in approximate alignment therewith, each bore provided with a discharge passage, said pump body having a discharge passage therein to which said cylinder bore discharge passages connect, a large plunger in said large cylinder bore, a small plunger in said small cylinder bore, said body provided with passages for delivering fuel to said small cylinder bore, and with other passages for delivering fuel to the large cylinder bore, said fuel delivery passages arranged whereby upon reciprocation of the plungers said small plunger will discharge a predetermined quantity of fuel through said discharge passage prior to discharge of fuel by said large plunger, and means for rotating said large plunger for varying the quantity of fuel discharged by the large plunger.

GEORGE STEVEN.
ROY R. FRUEHAUF.

REFERENCES CITED

The following references are of record in the file of this patent:

UNITED STATES PATENTS

| Number | Name | Date |
|---|---|---|
| 1,002,306 | Perkins | Sept. 5, 1911 |
| 1,551,480 | Gruman | Aug. 25, 1925 |
| 1,834,061 | Joachim | Dec. 1, 1931 |
| 2,003,814 | Taylor | June 4, 1935 |
| 2,012,086 | Mock | Aug. 20, 1935 |
| 2,118,578 | Trapp | May 24, 1938 |
| 2,138,849 | Gambrill | Dec. 6, 1938 |
| 2,238,252 | Davis | Apr. 15, 1941 |
| 2,296,357 | Links et al. | Sept. 22, 1942 |
| 2,306,364 | Skaredoff | Dec. 22, 1942 |
| 2,368,423 | Olsen | Jan. 30, 1945 |
| 2,374,614 | Nichols | Apr. 24, 1945 |
| 2,390,762 | Woelfer, Jr. | Dec. 11, 1945 |
| 2,400,219 | Barnaby et al. | May 14, 1946 |
| 2,400,247 | Miller et al. | May 14, 1946 |